US011113945B2

(12) United States Patent
Moroniti et al.

(10) Patent No.: US 11,113,945 B2
(45) Date of Patent: Sep. 7, 2021

(54) AUTOMATED ROBOT ALERT SYSTEM

(71) Applicant: Maidbot, Inc., Austin, TX (US)

(72) Inventors: David Moroniti, Austin, TX (US);
Nicholas Sweet, Austin, TX (US);
Micah Estis Green, Austin, TX (US)

(73) Assignee: Maidbot, Inc., Austin, TX (US)

( * ) Notice: Subject to any disclaimer, the term of this patent is extended or adjusted under 35 U.S.C. 154(b) by 136 days.

(21) Appl. No.: 16/396,180

(22) Filed: Apr. 26, 2019

(65) Prior Publication Data
US 2019/0333359 A1 Oct. 31, 2019

Related U.S. Application Data

(60) Provisional application No. 62/663,145, filed on Apr. 26, 2018.

(51) Int. Cl.
| | |
|---|---|
| *G08B 21/18* | (2006.01) |
| *G08B 25/00* | (2006.01) |
| *G08B 21/20* | (2006.01) |
| *B25J 9/16* | (2006.01) |

(52) U.S. Cl.
CPC ............ *G08B 21/182* (2013.01); *B25J 9/163* (2013.01); *G08B 21/20* (2013.01); *G08B 25/007* (2013.01)

(58) Field of Classification Search
CPC ........ B25J 9/163; G08B 21/182; G08B 21/20; G08B 25/003; G08B 25/005; G08B 25/006; G08B 25/007; G11B 17/04
See application file for complete search history.

(56) References Cited

U.S. PATENT DOCUMENTS

| | | | | |
|---|---|---|---|---|
| 2012/0259962 | A1* | 10/2012 | Bose | ........................ H04L 41/50 709/223 |
| 2015/0341603 | A1* | 11/2015 | Kasmir | ............... H04M 1/0291 348/143 |
| 2015/0347910 | A1* | 12/2015 | Fadell | ................. H04L 12/2825 706/46 |
| 2017/0225336 | A1* | 8/2017 | Deyle | .................. G08B 13/196 |
| 2017/0291315 | A1 | 10/2017 | Wise | |

(Continued)

FOREIGN PATENT DOCUMENTS

WO  WO 2018/038553 A1  3/2018

OTHER PUBLICATIONS

PCT International Search Report and Written Opinion, PCT Application No. PCT/US19/29391, dated Jul. 10, 2019, 15 pages.

*Primary Examiner* — Omer S Khan
(74) *Attorney, Agent, or Firm* — Fenwick & West LLP

(57) ABSTRACT

A robot alert system includes a robot server that receives contextualized sensor data from one or more mobile robots and generates alerts to one or more individuals according to a set of configured alert rules. The contextualized sensor data includes location data indicating a location of the mobile robot and sensor data obtained by the mobile robot representing sensed conditions of an environment associated with the location. The robot server accesses staff member data associated with each of a plurality of staff members from a staff member database and accesses a set of stored alert rules specifying alert criteria for triggering the alert. Responsive to determining that the contextualized sensor data meets the alert criteria for s target staff member, the robot server generates and transmits an alert to a client device associated with the target staff member.

20 Claims, 4 Drawing Sheets

(56) References Cited

U.S. PATENT DOCUMENTS

2018/0061220 A1\* 3/2018 Greene .............. G06K 9/00771
2018/0082573 A1\* 3/2018 Zuckerman .......... G08B 25/001
2020/0225673 A1\* 7/2020 Ebrahimi Afrouzi .......................
                                                        B25J 9/1697

\* cited by examiner

AUTOMATED ROBOT ALERT SYSTEM

CROSS REFERENCE TO RELATED APPLICATIONS

This application claims the benefit of and priority to U.S. Provisional Application No. 62/663,145, filed Apr. 26, 2018, the contents of which are incorporated by reference herein in their entirety.

BACKGROUND

This disclosure relates generally to mobile robotics, and more specifically, to an automated alert system for a robot.

When a robot is working in concert with humans, the ability for a robot to notify its collaborators of important alerts can be invaluable. However, the human-robot collaborators may not be co-located, in which case some intermediate message carrier system may be utilized to relay the alert from the robot entity to the human collaborator. In organizations that control a fleet of robots, it is important for the alerts to be tailored to the organizations needs and for alerts to be routed to the appropriate individual at the right times.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a mobile robot. Mobile robots can include a number of sensors, data retrieval systems, communication systems, and other components as described in greater detail below. Accordingly, a mobile robot can access data associated with or describing an environment in which the robot operates, for instance from the on-board sensors, from a data source external to the robot, or from a human operator. In response to or based on the accessed data, the mobile robot can perform a number of functionalities, either autonomously or in response to operator input. While the mobile robot is described herein as operating in an indoor environment and performing various housekeeping functions, in other embodiments the mobile robot can operate in other environments and can perform other functions while adhering to the principles described herein.

Figure 1:
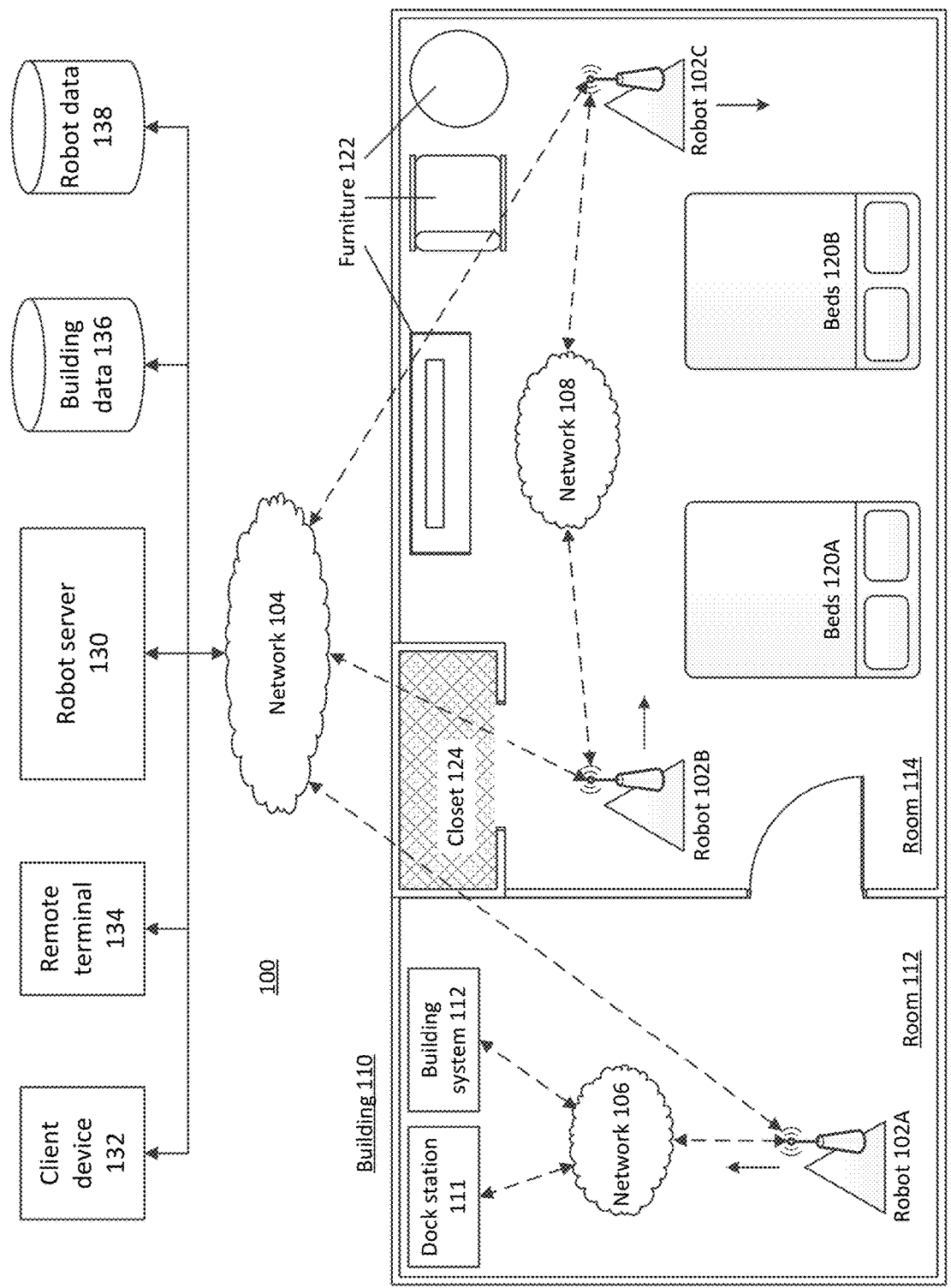
FIG. 1 illustrates an example environment in which a mobile robot can operate, according to one embodiment.

FIG. 1 illustrates an example environment 100 in which a mobile robot can operate, according to one embodiment. The environment includes three mobile robots including robot 102A, robot 102B, and robot 102C (collectively "robots 102"), operating within a building 110. The building 110 includes two rooms: room 112 and room 114. In an example embodiment, the room 112 is a hotel hallway and the room 114 is a hotel bedroom. In such embodiments, the robots 102 can perform housekeeping or other operations within the rooms 112 and 114, as described herein.

The robots 102 can wirelessly communicate with a robot server 130 via a first network 104. Likewise, the robot server 130 and/or the robots 102 (via the robot server 130) can communicate with one or more of a client device 132, a remote terminal 134, a building database 136, and a robot database 138 via the first network 104. The robots 102 can also communicate with building infrastructure, such as the dock station 111 and the building station 112, via the second network 106. Further, the robots 102 can communicate with each other via the third network 106. Although three distinct networks are illustrated in the embodiment of FIG. 1, in other embodiments, the robots can communicate via fewer or more networks, or one or more of the networks 104, 106, and 108 can be the same network. The robot server 130 can be any server, any computing device, or any system with which the robots 102 can communicate and configured to perform the functionality described herein.

The networks 104, 106, and 108 can each include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the robots 102, building infrastructure, the robot server 130, and any other systems or components (including but not limited to the client device 132, the remote terminal 134, the building database 136, and the robot database 138). For instance, the network 104 can include the Internet, and the robots 102 can interface with the Internet via WiFi. Likewise, the network 106 can be a Bluetooth or Bluetooth Low Energy (BLE) wireless network, enabling the robot 102A to communicate with the dock station 111 and the building system 112 when within a communication threshold proximity of either system. Finally, the network 108 can be a long-distance communicative network, enabling the robots to communicate as a point-to-point network, for instance using GSM transceivers.

The robots 102 can navigate within the building 110, for instance by autonomously planning a route through the building, by following a pre-determined route, or by modifying a route based on the detected environment in which the robot is navigating. In some embodiments, the robots 102 can navigate collectively, for instance by individually selecting a route such that a collective goal is achieved. For example, if the robots 102 are tasked with vacuuming the entirety of the building 110, the robots 102 can each select a route that minimizes an amount of time it takes the robots 102 to entirely vacuum the building, or can select routes that maximize an amount of time each robot 102 is vacuuming a portion of the building floor that has yet to be vacuumed. Likewise, if the robots 102 are tasked with mapping an entirety of the floorplan of the building 110, each robot 102 can individually select a route that minimizes an amount of time it takes the robots 102 to view the floorplan. The robots 102 can communicate with each other via the network 108 or via the robot server 130 in order to coordinate route selection.

The robots 102 can also navigate independently, for instance to complete a task assigned to the robot 102 (such as individually vacuuming or mapping a space, identifying anomalies within a room, identifying other tasks that need to be performed, etc.) In some embodiments, a robot 102 can select a route that minimizes a transit time from a first location to a second location, that minimizes travel through unknown locations, or that guarantees that the robot 102 can navigate to a power dock station 111 before it runs out of power. For example, in the embodiment of FIG. 1, the room 114 includes the beds 120A and 120B, the furniture 122, and the closet 124. In this embodiment, the robot 102B can access a map (for instance, from the building database 136) to identify the locations of these objects within the room 114, or can identify the locations of these objects using object detection functionality (such as a camera and/or depth sensor), and can select a route around these objects or other obstacles based the identified locations.

In some embodiments, one or more rooms within the building 110 can include a dock station 111. The dock station 111 can electrically couple to a robot 102, for instance when the robot 102 drives up to a dock station base and physically couples to a dock station power outlet or connector. In some embodiments, the robot 102 can select a route to the dock station 111 when the power available to the robot 102 falls below a threshold, or can automatically return to a dock station 111 when a particular task is completed. In some embodiments, the robots 102 can remain at a dock station 111 until a subsequent task is assigned to the robot 102, until a subsequent periodic task is to be performed, and the like. In some embodiments, the dock station 111 can also act as an access point, enabling communications between the robots 102 and one or more systems external to the robot 102. Likewise, the dock station 111 may be able to perform a diagnostic check of one or more robot components or systems, and can communicate this information to an external system (e.g., the robot server 130).

The building system 112 can include any system capable of wirelessly communicating with a robot 102, such as a fire detector system, a wireless modem, a thermostat, a clock, an entertainment system, a smart lighting system, an elevator, a housekeeping or front desk computer, or the like. A robot 102 can communicate with the building system 112, for instance by receiving information or instructions from the building system 112 or by providing information or instructions to the building system 112. For instance, the robot 102 may determine that the beds 120A and 120B in the room 114 need to be made, and can instruct a housekeeping computer (e.g., a client device 132) to schedule the room for housekeeping. Likewise, the robot 102 can determine that the temperature within the room 114 is above a comfort threshold, and can instruct a thermostat to reduce the temperature. In an embodiment, the robot 102 can detect localized temperatures at different positions within a room using sensors on the robot 102 and/or may obtain a room temperature measured by a thermostat in the room. It should be noted that in some embodiments, the building system 112 does not wirelessly communicate with the robot 102, and instead the robot 102 can determine information displayed by or otherwise conveyed by the building system 112. For instance, the robot can capture an image of a thermostat display in order to determine a temperature of a room, or can capture an image of a room number to identify a room.

The robot server 130, the client device 132, the remote terminal 134, the building database 136, and the robot database 138 are computing systems configured to communicate with each other and with one or more robots 102 and/or building infrastructure via the network 104 or one or more other networks. In some embodiments, fewer, additional, or different computing systems are included within the environment 100 than those shown in FIG. 1. Further, one or more of the computing systems of FIG. 1 can be combined (such as the remote terminal 134 and the client device 132). Although the computing systems of FIG. 1 are illustrated as external to the building 110, in practice these computing systems can be located in any suitable location, including within the building, within a different building, in a datacenter, in the possession of an operator or user, and the like.

The robot server 130 provides a communicative interface between the robots 102 and one or more other systems of FIG. 1. For instance, the robot server 130 can provide an instruction to a robot 102 to vacuum the room 114, can receive a request for floorplan data from the robot 102 in response to the instruction, can access the floorplan data from the building database 136 and provide the floorplan to the robot 102, and can receive diagnostic information from the robot 102 indicating that a repair to the robot 102 is needed and provide the diagnostic information to a client device of hotel staff. In some embodiments, the robot server 130 is a cloud server, enabling long distance operation of and communication with the robots 102.

The client device 132 is a computing system, such as a mobile phone, a desktop computer, a tablet, and the like enabling an operator to interface with the robots 102. For instance, video captured by a robot 102 can be provided to the robot server 130 and routed to a client device 132 for viewing by an operator. In some embodiments, the environment 100 of FIG. 1 can include any number of client devices 132, each assigned to a particular operator. In such embodiments, data received from the robots 102 by the robot server 130 can be routed to the appropriate client device 132. For instance, if the robot server 130 receives an indication from a robot 102 that a particular hallway needs to be cleared of debris, the robot server 130 can provide the indication to the client device 132 operated by housekeeping staff. Likewise, if the robot server 130 receives an indication that a pipe is leaking, the robot server 130 can provide the indication to the client device 132 operated by maintenance staff. Operators can provide instructions to the robots 102 via the robot server 130 from the client devices 132. For example, housekeeping staff can use a mobile phone as a client device 132 to provide an instruction to the robot 102 to vacuum the room 114, and the robot 102 can navigate to the room 114 and begin vacuuming in response to receiving the instruction.

The remote terminal 134 includes an interface displayed to an operator via a device display, such as a mobile device, computer monitor, and the like. As noted above, in some embodiments, the remote terminal 134 is displayed via a client device 132, though in other embodiments, the remote terminal 134 is displayed within dedicated hardware. Information received from a robot 102 (for instance, via the robot server 130) can be displayed within the remote terminal interface, such as video or images captured by the robot 102, diagnostic information associated with a robot 102, a map indicating a route being navigated by the robot 102, a map indicating a location of the robot 102 received from the robot 102, a map allowing an operator to configure a route of the robot 102, a set of displayed instruction elements that (when selected) can configure the behavior of the robot 102 to perform one or more tasks, or any other suitable information associated with the robot 102, the building, or one or more other systems or components of FIG. 1. The remote terminal 134 can enable an operator to provide instructions to one or more robots 102 by interacting with the remote terminal interface. For instance, an operator can select a room (such as the room 112) from a map interface displayed within the remote terminal interface, can select a robot 102 (such as robot 102A) from a list or set of corresponding robot icons displayed within the remote terminal interface, and can select an interface element corresponding to a particular task (such as vacuuming) in order to instruct the robot 102A to vacuum the room 112.

The building database 136 includes data associated with the building 110, such as a floorplan of the building, a location of objects within the building 110, a location of doors and windows within the building 110, information associated with building infrastructure, a schedule associated with the building 110, building occupancy or guest information, building staff information, and the like. The robot database 138 includes data associated with the robots 102, functions the robots 102 can perform, robot maintenance information, and the like. In some embodiments, the robot database 138 can include routes through the building 110, robot routine information (such as periodic cleaning schedules), diagnostic or communication information associated with the robots, and the like. The building database 136 and the robot database 138 can be accessed by the robot server 130, by the robots 102, or by one or more other components of FIG. 1.

Robot Overview

Figure 2:
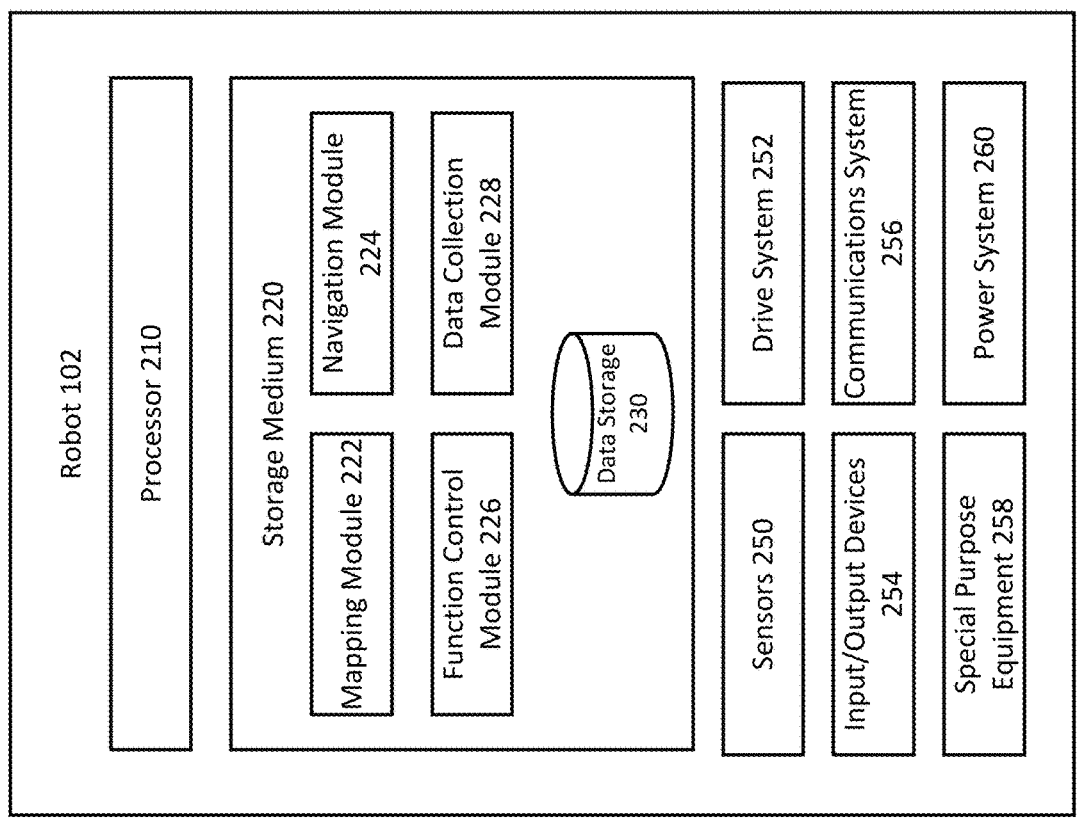
FIG. 2 illustrates an example embodiment of a robot.

FIG. 2 illustrates an example embodiment of a robot 102. The robot 102 comprises a processor 210, a storage medium 220, sensors 250, a drive system 252, input/output devices 254, a communications system 256, special purpose equipment 258, and a power system 260. In alternative embodiments, the robot 102 may include different, fewer, or additional components.

The sensors 250 comprise devices that measure or detect conditions or properties of the robot 102, the surrounding environment, or objects and entities within the surrounding environment. The sensors 250 then generate signals to the processor 210, storage medium 220, or other components of the robot 102 representative of the sensed conditions or properties. The sensors 250 may include, for example, motion and orientation sensors such as an accelerometer, gyroscope, velocity sensor, or positioning sensor. The sensors 205 may also include object detection sensors, such as a RADAR sensor, LIDAR sensor, and the like. Furthermore, the sensors 250 may include devices such as a light sensor, a noise sensor, a moisture sensor, a thermometer, a dust sensor, a mold sensor, or other sensor for detecting environmental conditions. In yet other embodiments, the sensors 250 may include capture systems such as a still image camera, a video camera, or a microphone. The sensors 250 may include integrated processing devices for processing sensor data before sending it to other components of the robot 102. For example, the sensors 250 may include integrated filters or data conversion processors that may convert the sensor data from its raw captured form to a processed form.

The drive system 252 includes one or more drive components and/or controllers for controlling motion of the robot 102. For example, the drive system 252 may include a set of wheels, one or more drive motors, wheel shafts for providing energy from the drive motors to the wheels, and a drive controller for controlling the drive motors. In an embodiment, the drive system 252 may be configured to enable the robot 102 to navigate in any of multiple different directions regardless of the orientation of the robot. For example, the drive system 252 may include Mecanum wheels or Omni wheels that enable the robot 102 to move in a direction parallel to its axis of orientation, perpendicular to its axis of orientation, or diagonally relative to its axis of orientation. Furthermore, the drive system 252 may enable the robot 102 to rotate in place to a desired orientation.

The input/output device 254 comprise various devices for capturing inputs provided to the robot 102 and generating output information. Input devices may include, for example, buttons, dials, or switches, or a touchscreen display for controlling various functions of the robot 102, or may include ports for connecting external input devices such as, for example, a USB port or other serial or parallel input port. The output devices may include, for example, a display, a lighted indicator such as an LED, a haptic device, a speaker, or an output port for connecting to external output devices (e.g., a USB port).

The communications system 256 comprises a wired or wireless communication interface for communicating with external devices (e.g., via the network 104). The communications system 256 may comprise, for example, a Bluetooth interface, a WiFi interface, a cellular communication interface, or other communication interface.

The special purpose equipment 258 comprises components of the robot 102 for performing specific tasks relating to a specialized configuration the robot 102. For example, in a robot 102 designed for vacuuming, the special purpose equipment 258 may comprise a vacuum motor and a vacuum brush. In a robot 102 designed for mopping, the special purpose of equipment 258 may comprise a water tank and a mop head. In other robots 102 (e.g., a robot designed for mapping an area), the special purpose equipment 258 may be omitted.

The power system 260 stores power and supplies power to the robot 102. For example, the power system 260 may comprise a battery or a port for connecting to an external power source (such as a dock station 111). In an embodiment, the power system 260 may include separate power sources for powering high-voltage components such as the drive system 252 and low-voltage components such as integrated electronics.

The storage medium 220 (e.g., a non-transitory computer-readable storage medium) comprises volatile memory, non-volatile storage, or a combination thereof. The storage medium 220 stores instructions that when executed by the processor 210 causes the processor 210 to carry out the functions attributed to the various modules described herein (e.g., a mapping module 222, a navigation module 224, a function control module 226, and a data collection module 228). Additionally, the storage medium 220 may include a data storage 230 to store various data collected by or utilized by the robot 102.

The mapping module 222 includes instructions for automatically mapping an area (e.g., such as a room). For example, the mapping module 222 may control the drive system 252 of the robot 102 to navigate an unexplored space in a particular pattern and process data from the sensors 250 to predict locations of walls, furniture, or other objects. The mapping data may be stored to the data storage 230 or may be transmitted to the robot server 130 for storage in the building data 136.

The navigation module 224 includes instructions for controlling navigation of the robot 102. The navigation module 224 may control the robot 102 in an automated manner to complete a certain task assigned to the robot 102 (e.g., mapping a space or cleaning a room) or may navigate in response to manual commands from an operator. In an embodiment, the navigation module 224 may utilize mapping data from the local data storage 230 or the building data 136 to determine an efficient navigation route for completing the assigned task. Furthermore, the navigation module 224 may utilize mapping data and real-time sensing data to navigate in a manner that avoids objects.

The function control module 226 comprises instructions for controlling various functions of the robot 102 to enable the robot 102 to complete an assigned task. For example, for a vacuuming robot 102, the function control module 226 may control the speed of a brush assembly or suction power of a vacuum. For a mopping robot, the function control module 226 may control the spray of water and the spin speed of the mop head. In other embodiments, the function control module 226 may control other special purpose equipment 258 of the robot 102 according to its particular assigned task. In some embodiments, the functions of the robot include operations such as vacuuming, mopping, scrubbing, cleaning, dusting, making a bed, moving a customer's belongings, moving furniture, opening doors, and communicating with a human.

The data collection module 228 comprises instructions for controlling collection and processing of data (e.g., from the sensors 250) obtained by the robot 102. The data collection module 228 may collect and process different types of data depending on a particular data collection task that may be assigned to the robot 102. For example, the data collection module 228 may collect moisture data to determine areas of a room that are particularly damp. In another example, the robot 102 may collect dust data to determine an overall cleanliness factor for a particular room. The data collection module 228 may store the collected data or may share it in real-time with other modules to enable those modules to execute their respective functions, or may provide the collected data to one or more external entities (such as another robot 102, the robot server 130, the remote terminal 134, the robot data store 138, and the like).

Automated Alert System

As tasks that have traditionally been performed by humans are delegated to a robot 102, it becomes important to maintain many of the capabilities a human would conventionally perform during the completion of the task. For instance, a janitor tasked with sweeping a floor would typically be expected to alert her superiors of any suspicious items found when sweeping. It is desirable for the robot 102 to similarly understand the importance and context of any anomalies that arise when accomplishing a task and to generate an alert to report such anomalies or other important information.

In an embodiment, the robot server 130 generates alerts associated with one or more robots 102 that contains enough information to allow an interpreter (e.g., a human or artificial intelligence agent) receiving the alert (e.g., via a client device 132 or remote terminal 134) to triage the alert. For example, the alert may include a message with a succinct description of the nature of the alert, with supporting information (e.g., a time and place together with other contextual information). The descriptive content of the message may vary greatly depending on the anomaly itself, although general alert patterns may be implemented to ease the translation.

Figure 3:
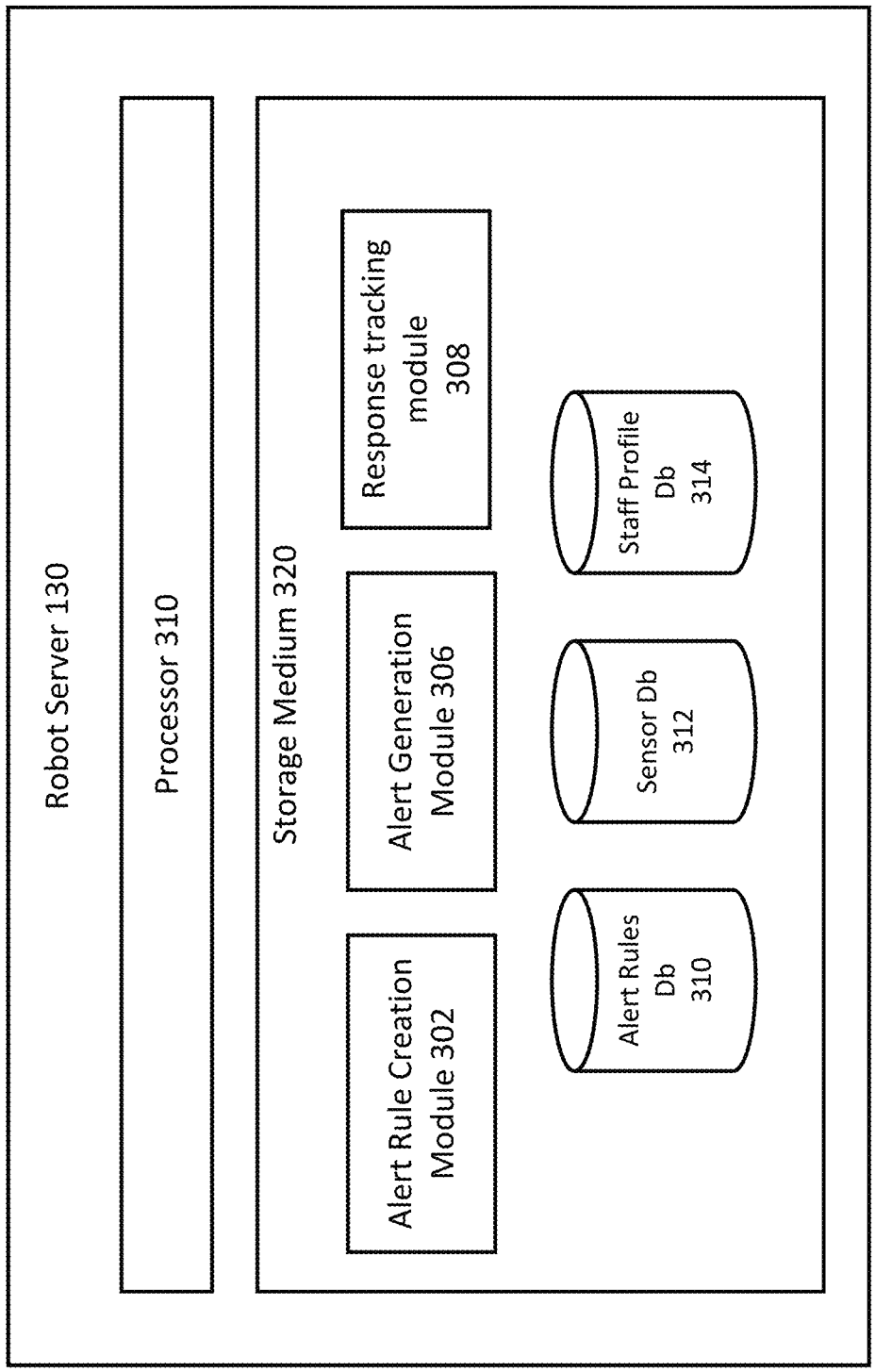
FIG. 3 illustrates an example embodiment of a robot server for generating alerts associated with a fleet of robots.

FIG. 3 is a block diagram illustrating an embodiment of a robot server 130 for generating alerts based on data received from a fleet of robots 102. The robot server 130 comprises a processor 310 and a storage medium 320 (e.g., a non-transitory computer readable storage medium) that stores data and various functional modules. The functional modules comprise instructions for carrying out functions attributed to the robot server 130 as described herein. In an embodiment, the modules of the storage medium 320 include an alert rule creation module 302, an alert rule distribution module 304, an alert generation module 306, and a response tracking module 308. Additionally, the storage medium 320 stores various databases including an alert rules database 310, a sensor database 312, and a staff profile database 314. In alternative embodiments, the robot server 130 may include different or additional modules and databases. Furthermore, one or more of the illustrated databases may be combined into a database that collectively stores information relating to the one or more illustrated databases.

The alert rule creation module 302 generates a set of rules for providing alerts relating to a fleet of robots 102 and stores the rules to the alert rules database 310. The alert rule creation module 302 may dynamically create or update rules in an automated way or rules may be manually configured by an administrator of the robot server 130. Each rule may specify a set of criteria for triggering a particular alert and criteria specifying how the alert should be distributed (e.g., what information is provided in the alert, who should receive the alert, when the alert should be sent, in what format the alert should be sent, etc.) The criteria for triggering the alert may be based on, for example, sensor data from a robot 102, a condition associated with the sensor data, a time of occurrence of a detected condition, a location of occurrence of the detected condition, a state of the robot (e.g., indicative of the robot completing a cleaning task or other assigned task), a manual input (e.g., a code) entered directly on a user interface of the robot 102, and/or additional contextual information. Examples of sensor data that may be referenced in alert rules may include, for example, existence of a sensor reading, a value for a particular sensor reading, detection of a measured sensor value below a specified cutoff, or detection of a measured sensor value above a specified cutoff. Examples of contextual information associated with sensor data may include, for example, an identification of a location of an environment associated with a particular condition, a size of an affected area, an indication that a particular sensed condition has persisted over a particular time period, and elapsed time since a condition was detected, etc. The location data may indicate a specific unique location, a general area, and/or a type of area associated with the sensor data (bathroom, bedroom, hallway, etc.)

An alert rule may further specify a particular aggregation or filtering of sensor data received from the robot 102 such that the rule is triggered based on a condition inferred from the raw sensor data. Here, the alert rule may specify triggering an alert in response to a set of data that is accumulated over some time period to enable the robot server 130 to generate stronger prediction of issues.

The alert criteria may comprise one or more thresholds with respect to different data types or detected conditions that cause an alert to be triggered. Furthermore, the alert criteria may include different binary operators that can be used to generate rules that trigger an alert in response to some combination of detected conditions. For example, a rule may trigger an alert if a value for a condition A is greater than a threshold A AND a value of a condition B is greater than a threshold B. Alternatively, operators such as OR, XOR, NOT, etc. may be used to generate rules that trigger an alert.

In an example embodiment, the rule creation module 302 may create rules that specify one or more functions that combine different types of sensor data or contextual information into a combined value prior to comparing to a threshold. Here, a rule may be created that triggers an alert in response to a weighted combination or other function of a first sensed value and a second sensed value exceeding a threshold. For example, a rule may be created to trigger an alert based on a detected size of an area affected with a particular condition, in which the size of the affected area is calculated from knowledge of the robot's position when the measurements are taken (e.g., trigger an alert in response to average dust readings over a 10 square foot area exceed a predefined threshold).

The alert rule creation module 302 may be configured to tailor alerts in a way that helps ensure that the alerts are providing actionable and relevant information. For example, the alert rule creation module 302 may automatically filter duplicate alert rules so that multiple alerts are not triggered by the same event, and may filter duplicate or irrelevant information provided in an alert.

The alert rule creation module 302 may furthermore automatically adapt thresholds of the rules that are used for triggering alerts. For instance, if a threshold is set too low, alerts may be generated but not acted on by the staff because the staff does not deem the alert to be significant enough or because there are too many alerts for the staff to handle. In this case, the alert rule creation module 302 may automatically upwardly adjust the threshold in order to trigger fewer alerts. Alternatively, if the alerts are being responded to very quickly, the alert rule creation module 302 may automatically adjust one or more thresholds downward to enable the staff to more quickly address even minor issues. Automatically adjusting the alert thresholds removes the burden of manually setting thresholds for alerts, reduces extraneous alerts, and providing more valuable feedback. In an embodiment, the alert rule creation module 302 adjusts the thresholds based on tracking of response times to alerts as described below. Thus, for example, if alerts are being responded to very quickly, thresholds may be reduced to allow more frequent alerts to be generated, while if alerts are being responded to relatively slowly, threshold may be increased to cause less frequent alerts to be generated.

In an embodiment, a rule may have multiple alert thresholds that are set differently for different staff members or groups of staff members. For example, a first group of staff members may receive an alert in response to a first threshold being met and a second group of staff members may receive the alert if a second threshold is met. In one example embodiment, a maintenance worker may receive an alert when a robot has been offline for over one hour, while a supervisor may receive the alert only when the robot has been idle for over 24 hours, indicating that the maintenance worker may not have properly addressed the issue. Alternatively, instead of the alert rule specifying specific thresholds, an alert rule may be configured to apply individual-specific thresholds associated with different staff members that may be set differently for different staff members as indicate in the staff profile database 314.

In an embodiment, the thresholds and criteria may initially be predefined by an administrator based on staff roles. Each staff member can then custom define further alerts and adjust the thresholds from the default setup. For example, the staff profile database 316 may cross-reference alert thresholds set for individual staff members for the rules applicable to those staff members. In some embodiments, staff members may be able to adjust these thresholds on an individual basis. Alternatively, the staff profile database 316 may store multipliers associated with individual staff members that are used to automatically adjust individual thresholds up or down based on some global threshold associated with the rule. For example, a staff member may configure a 1.5× multiplier to only receive alerts when the alert criteria exceeds 1.5× the global threshold set in association with the rule.

In an embodiment, the alert rule creation module 302 can utilize rules that specify the recipients of alerts based on individual unique identifiers or based on labels describing one or more characteristics of the recipients. For example, a staff profile database 316 may store profile information associated with staff members that may be recipients of alerts. The staff profile database 316 may store, for example, a unique identifier for the staff member, other identifying information for the staff member, a job title, department or group to which the staff member belongs, a role of the staff member, a skillset of the staff member, a working schedule for the staff member, a current availability indicator for the staff member, alert preferences, or other information useful for determining if and how to provide alerts to the staff member. In an example embodiment, possible roles of staff members stored in the staff member database may include, for example, head of housekeeping, front desk operator, maintenance worker, houseman, general manager, security, developer, and technician. By utilizing the staff profile database 316, the alert rule creation module 302 may generate alert rules that cause alerts to be sent to staff members meeting certain specified criteria without necessarily identifying the particular staff member. For example, a rule may specify that a particular alert should be sent to all available staff members within a particular department (e.g., maintenance department) that have particular skills (e.g., electrical repair skills). Furthermore rules may specify that alerts should be sent only to staff members that have availability at the time of the alert. Here, availability may be based on the staff member's work schedule, and tracking information indicating if the staff member is already deployed on another task or is otherwise available. Creating rules that limit the recipients of the alerts to individuals meeting specified criteria ensures that alerts can be efficiently resolved without overburdening staff members with irrelevant alerts.

In an embodiment, alert rules may specify contingent alerts that are generated contingently on a particular event. For example, an alert sent to a specific staff member of group of staff members may be triggered only if alert criteria is met based on the contextualized sensor data and if previously alerted staff members have not been responsive to the alert. In this way, sequences of alerts can be created to escalate an issue, in which an alert is first sent to a primary target staff member (or group of staff members), and is then sent to a secondary target staff member (or group of staff members) if not resolved.

In an embodiment, the alert rule creation module 302 provides an administrative user interface that enables an administrator to create, delete, or edit alert rules associated with a particular organization. In an embodiment, the administrative user interface comprises a graphical user interface. Alternatively, an xml schema or programming language may be used to create or edit alert rules in a text document. The alert rule creation module 302 may also provide a user interface for individual staff members that enable staff members to review and edit aspects of the rules (e.g., alert thresholds) that apply individually. The administrative user interface may furthermore enable administrators or individual staff members to change alert frequencies or snooze an alert (e.g., to dismiss the alert and cause it to be re-issued after a set period of time). These configuration settings may be applied to alerts for individual staff members or for groups of staff members.

The alert rule generation module 306 generates alerts when criteria of an alert rule in the alert rules database 310 is met. Here, the alert rule generation module 306 obtains, from the alert rules database 310, the content of the alert and rules for distributing the alert to relevant individuals. The alert rule generation module 306 then generates the alert based on the rules. Alerts may be generated differently depending on whether the target of the alert is co-located with the robot 102 or at a remote location. If the target of the alert is co-located with the robot 102, the alert generation module 306 may cause the robot 102 to output the alert (e.g., in the form of a visual display, auditory signal, and/or haptic feedback). If the target of the alert is remote from the robot 102 or if it is otherwise preferable to provide the alert on a device separate from the robot 102 (e.g., the target individual's mobile device), a messaging infrastructure may be utilized to transmit the alert from the robot server 130 to a client device 132 or remote terminal 134 associated with the target individual. For example, Internet services (or other network technologies) may be utilized to accomplish this remote message-sharing. In example embodiments, the alert generation module 306 may employ communication services such as e-mail, Representational State Transfer (REST) web infrastructures, chat applications, automated voice communication systems, and Short Message Service (SMS). The robot server 130 beneficially automatically selects the appropriate transmission method, appropriate receivers, and appropriate content based on preferences in the staff profile database 316 or other circumstantial information. The mode of transmission of alerts may be individually configured according to staff member preferences in the staff profile database 314 so that different staff members may receive alerts in their preferred format.

The data collection module 304 obtains sensor data from the robots 102 and may store the sensor data to the sensor database 312. The data collection module 304 may receive raw sensor data from the robots 102 and may receive processed or aggregated sensor data from the robot 102 indicative of a particular detected condition. In an example embodiment, types of sensor data that may be received by the robot server 130 from the robot and processed to generate alerts may include, for example, temperature, humidity, volatile organic compounds, dust/dirt, bag fullness, battery voltage, remaining power, power consumption, Wifi strength, Bluetooth proximity, and LIDAR scanner data.

The data collection module 304 may furthermore obtain contextual metadata to be stored in the sensor database 312 together with the sensor data. The contextual metadata may be obtained from the robot 102 or from other data stores such as the building data store 135 or robot data store 138. For example, the data collection module 304 may obtain and store in association with the sensor data, an identifier for the robot 102 capturing the sensor data, an identifier for a room/area the robot 102 was in while the data was captured, an identifier for a location of the room/area the robot 102 was in when the measurement was taken, a capture time of the sensor data, and a relevant state the robot 102 during capture, maps of each room/area and location of points-of-interest in the rooms/areas (e.g., location of AC unit, location of furniture, doorways, etc.).

The response tracking module 308 tracks reaction times to alerts. For example, the response tracking module 308 may track a time between when an alert is issued and when the robot server 130 receives an acknowledgement of the alert being addressed. The acknowledgment may be sent manually by a staff member that receives the alert or may be triggered automatically upon detecting the staff member in proximity to the robot 102 that is the subject of the alert, upon detecting that the underlying issue is resolved, or upon receiving a manual indication from the staff member that the issue is being worked on or is resolved. For example, if the alert is triggered to alert a staff member that a battery of the robot 102 should be replaced, an acknowledgement may be automatically triggered upon the robot 102 detecting the battery replacement. The response times may be used by the alert rule creation module 302 to adjust thresholds associated with generating alerts as described above to ensure that alerts are generated at a desired frequency given staff availability.

The response tracking module 308 may also track responses to alerts from staff members that indicate which staff member accepts to undertake a particular task based on a received alert. The response tracking module 308 may then update availability of the staff member in the staff profile database 316 to indicate that the staff member is unavailable. The response tracking module 308 may furthermore provide a further update upon detecting that the issue is resolved to indicate that the staff member is no longer deployed for a task and may be available.

In an embodiment, an alert flag is set in the robot server 130 upon triggering an alert and remains set until reset by a staff member or until some other condition is automatically detected. If an alert is not handled by anyone or remains unacknowledged by the recipient for a period of time (e.g., the alert flag is not reset), the robot server 130 may automatically send an alert to a different staff member as may be specified as a contingency associated with the alert rule.

Figure 4:
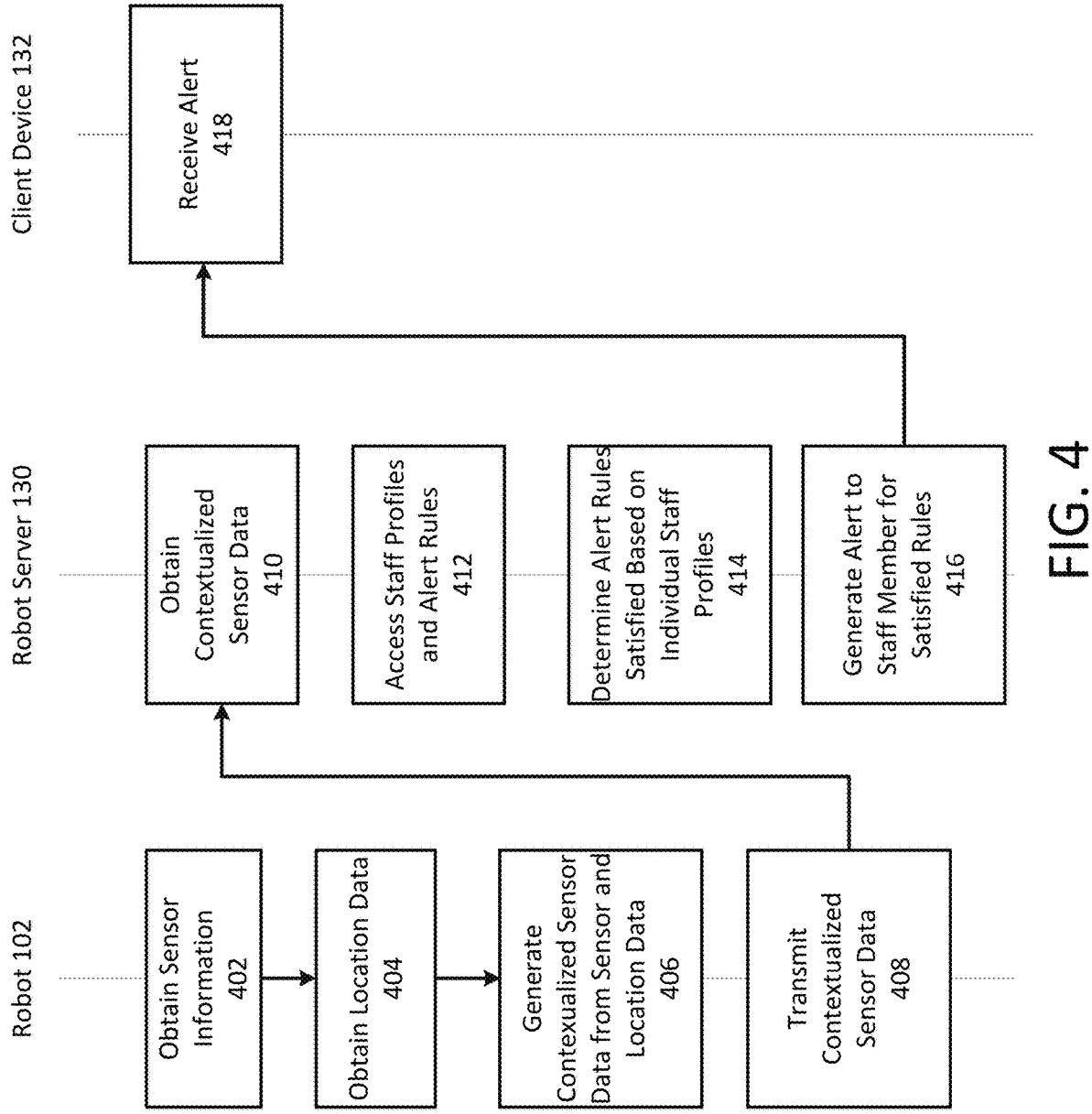
FIG. 4 illustrates an example embodiment of a process for generating alerts based on sensed robot data.

FIG. 4 illustrates an example embodiment of a process for generating alerts based on sensed robot data. The robot 102 obtains 402 sensor information from the onboard sensors 250, examples of which are described above. The robot 102 furthermore obtains 404 location data indicating its location within its environment and stores the sensor data together with a location indicator indicating the location of the robot 102 when each data sample was collected to generate 406 contextualized sensor data. The contextualized data is transmitted 408 over the network 104 to the robot server 130. The robot server 130 obtains 410 the contextualized sensor data from the robot 102. The robot server 130 also accesses 412 the staff profile database 316 storing information about the staff members and the alert rules database 310 storing the alert rules that include the alert thresholds, which may be associated with different staff member or groups of staff members. The server 130 determines 414 alert rules that are satisfied for individual staff members. For example, the robot server 130 processes the sensor data according to a set of predefined processing rules and may determine at predefined intervals for each individual staff member, if the processed data meets criteria for triggering an alert for that particular staff member based on the specific alert criteria (e.g., threshold values) associated with the staff member. For example, a particular rule may be satisfied for a particular staff member if the sensor data meets a threshold associated with the staff member and the staff member is currently available based on information in the staff profile database 316 (e.g., according to their work schedule, clock in/out status, on-call status, etc.) For rules that are satisfied, the robot server 130 generates 416 alerts to the one or more staff members for which the criteria is met according to the staff member's predefined contact preferences stored in the staff profile database 316. The alert may be received 418 by a client device 132 associated with the staff member. The robot server 130 may repeat the check for the additional staff members, or the process may be performed in parallel for multiple staff members.

Several example scenarios are described below illustrating how the robot alert system may be utilized to satisfy various goals. In a first example scenario, a robot 102 is cleaning room 4120 when a humidity sensor in the robot 102 starts reading 100%. The robot 102 sends the humidity readings, current room, current location in room, and temperature reading to the robot server 130. Based on alert rules in the robot server 130, the robot server 130 process the sensor data to determine the size of the wet area, how wet it is, and where in the room it is located. For example, the robot server 130 may identify a wet area of the room in which the humidity data exceeds a predefined threshold. The robot server 130 may furthermore obtain a map of the room including locations of possible sources of leaks, and compare the wet area of the room to the map to determine if the wet area is within a proximity threshold to one of the possible sources of leaks. In this example, the robot server 130 identifies that the location of the increased water measurement is within a small radius of the location in the room of the AC unit, and determines that the contextualized sensor data meets alert criteria for the rule in response. Of all the staff members set up to receive alerts in the hotel, 3 particular staff members are set to receive alerts about this potential maintenance issue associated with the described alert rule. For 2 of these 3 staff members, the measurements on size of the affected area is above their specific alert threshold associated with the rule. Both of the individuals are currently on duty, but one is currently occupied with another task. The server 130 therefore determines to notify the staff member who is not busy. The server 130 sends the notification of the issue via email and text to the staff member in accordance with the staff member's configured preferences. The notification contains an explanation of the problem along with a map of room 4120 and an identification of the predicted source of the leak within the proximity threshold to the wet area. The staff member receives the alert and may be deployed to resolve the issue.

In a second example scenario, a robot 102 is cleaning a long hallway at 2 am. After almost an hour of cleaning, the battery capacity, as measured by the voltage sensors on the robot 102 and the currently remaining battery capacity as tracked by the battery, is almost empty. The robot server 102 receives voltage sensor data from the robot 102 when the battery capacity falls below a predefined threshold indicative of the low battery. The robot server 130 then sends a text message to the night security guard in accordance with the guard's configured communication preferences to request that the guard bring a fresh battery to the robot 102 so that the robot 102 can finish the hallway with minimal downtime. In this case, the text message may include a last location of the robot 102 from the tracked location data and an indication of the low battery status.

In a third example scenario, a robot 102 is cleaning room 2113. Halfway through cleaning the room, a room attendant pulls the battery out of the robot 102 and moves the robot 102 to room 2114. When the robot 102 comes back online and begins cleaning room 2114, the cleaning coverage data from room 2113 is now incomplete. The server 130 obtains periodic heartbeat signals from the robot 102 during cleaning, and therefore can detect the approximate time when the robot went offline and the approximate time when it came back online. Thus, the robot server 130 can determine based on the connectivity status data and the location data, a location corresponding to the loss of connectivity and a location corresponding to the reconnection. The robot server 130 may furthermore determine based on historical location data prior to the loss of connectivity that the robot 102 did not finish cleaning the first room prior to being moved. For example, the robot server 130 can automatically determine based on the time between powering off the robot 102 and powering it back on again, that room 2113 could not have been finished. In this example, there is no further data about 2113 from the robot 102. An alert rule configured for this scenario specifies that an alert should be sent to the head of housekeeping. The server 130 therefore send a message is to the head of housekeeping indicating that the room has not been completely cleaned and therefore is not yet ready for a guest.

In another example scenario, a staff member may enter a code directly via a user interface on the robot 102 that triggers an alert. This system may be used, for example, to alert security staff to a potential safety threat and enable a staff member to issue the alert covertly. For example, if the staff member feels threatened by a hotel guest, the staff member may enter an alert code on the robot 102 that appears to the hotel guest to be consistent with operation of the robot 102 (e.g., starting a cleaning task), but is actually alerting hotel security to the location of the staff member and the suspected attacker.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like, for instance, within a robot or robot system. Furthermore, it has also proven convenient at times, to refer to these arrangements of operations as modules or engines, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described. Further, the functionalities described herein can be performed by a hardware processor or controller located within the robot.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for generating an alert associated with activity of a mobile robot, the method comprising:
   receiving contextualized sensor data from the mobile robot via a network, wherein the contextualized sensor data comprises humidity data obtained by the mobile robot, an identifier for a room where the humidity data was captured by the robot, and location data comprising locations in the room where the humidity data was captured;
   accessing staff member data associated with each of a plurality of staff members from a staff member database;
   accessing a set of stored alert rules, wherein a rule specifies alert criteria for triggering the alert associated with a target staff member of the plurality of staff members;
   determining if the contextualized sensor data meets the alert criteria associated with the target staff member by performing steps including:
      determining, from the location data and the humidity data, a wet area of the room where the humidity data exceeds a predefined threshold;
      obtaining a map of the room including locations of possible sources of leaks;
      comparing the wet area of the room to the map to determine if the wet area is within a proximity threshold to one of the possible sources of leaks; and
      determining that the contextualized sensor data meets the alert criteria responsive to the wet area meeting being within the proximity threshold;
   responsive to determining that the contextualized sensor data meets the alert criteria for the target staff member, generating an alert for the target staff member; and
   transmitting the alert to a client device associated with the target staff member.

2. The method of claim 1, wherein generating the alert comprises:
   generating the alert to contain the map of the room and an identification of a source of a leak within the proximity threshold to the wet area.

3. A method for generating an alert associated with activity of a mobile robot, the method comprising:
   receiving contextualized sensor data from the mobile robot via a network, wherein the contextualized sensor data comprises status data including connectivity status data of the mobile robot and location data representing locations of the mobile robot corresponding to the connectivity status data;
   accessing staff member data associated with each of a plurality of staff members from a staff member database;
   accessing a set of stored alert rules, wherein a rule specifies alert criteria for triggering the alert associated with a target staff member of the plurality of staff members;
   determining if the contextualized sensor data meets the alert criteria associated with the target staff member by performing steps comprising:
      determining, based on the connectivity status data and the location data, a first location corresponding to a loss of connectivity of the mobile robot to the network based on the connectivity status data;
      determining, based on the connectivity status data and the location data, a second location corresponding to a reconnection of the mobile robot to the network;
      determining based on historical location data prior to the loss of connectivity that the robot did not finish cleaning a room corresponding to the first location prior to being moved to the second location; and
      determining that the contextualized sensor data meets the alert criteria responsive to determining that the mobile robot did not finish cleaning the room;
   responsive to determining that the contextualized sensor data meets the alert criteria for the target staff member, generating an alert for the target staff member; and
   transmitting the alert to a client device associated with the target staff member.

4. The method of claim 3, wherein generating the alert comprises:
   generating the alert to indicate an identifier for the room and an indication that the room has not been completely cleaned.

5. The method of claim 3, wherein determining if the contextualized sensor data meets the alert criteria associated with the target staff member further comprises;
   determining that the contextualized sensor data meets alert criteria for multiple staff members including the target staff member;
   determining, based on stored staff member deployment data, which of the multiple staff members are occupied with a different task; and
   selecting the target staff member as one of the multiple staff members that is not occupied with the different task.

6. The method of claim 3, wherein the staff member data comprises a role for each of the plurality of staff members, an alert preference for each of the plurality of staff members, an availability status for each of the plurality of staff members, and alert criteria associated with different alerts for each of the plurality of staff members, wherein the alert criteria varies for different ones of the plurality of staff member.

7. The method of claim 3, further comprising:
   setting an alert flag in association with the alert; and
   responsive to the alert flag not being reset within a predefined time period, selecting an alternative staff member different from the target staff member for receiving the alert and sending the alert to the alternative staff member.

8. The method of claim 3, further comprising:
determining that the alert is historically triggered at greater than a threshold frequency; and
automatically reducing an alert threshold in the alert criteria associated with the alert.

9. The method of claim 3, further comprising:
determining that the alert is triggered at less than a threshold frequency; and
automatically increasing an alert threshold in the alert criteria associated with the alert.

10. A non-transitory computer-readable storage medium storing instructions for generating an alert associated with activity of a mobile robot, the instructions when executed by a processor causing the processor to perform steps including: receiving contextualized sensor data from the mobile robot via a network, wherein the contextualized sensor data comprises humidity data obtained by the mobile robot, an identifier for a room where the humidity data was captured by the robot, and location data comprising locations in the room where the humidity data was captured;
accessing staff member data associated with each of a plurality of staff members from a staff member database;
accessing a set of stored alert rules, wherein a rule specifies alert criteria for triggering the alert associated with a target staff member of the plurality of staff members;
determining if the contextualized sensor data meets the alert criteria associated with the target staff member by performing steps including:
determining, from the location data and the humidity data, a wet area of the room where the humidity data exceeds a predefined threshold;
obtaining a map of the room including locations of possible sources of leaks;
comparing the wet area of the room to the map to determine if the wet area is within a proximity threshold to one of the possible sources of leaks; and
determining that the contextualized sensor data meets the alert criteria responsive to the wet area meeting being within the proximity threshold;
responsive to determining that the contextualized sensor data meets the alert criteria for the target staff member, generating an alert for the target staff member; and
transmitting the alert to a client device associated with the target staff member.

11. A non-transitory computer-readable storage medium storing instructions for generating an alert associated with activity of a mobile robot, the instructions when executed by a processor causing the processor to perform steps including:
receiving contextualized sensor data from the mobile robot via a network, wherein the contextualized sensor data comprises status data including connectivity status data of the mobile robot and location data representing locations of the mobile robot corresponding to the connectivity status data;
accessing staff member data associated with each of a plurality of staff members from a staff member database;
accessing a set of stored alert rules, wherein a rule specifies alert criteria for triggering the alert associated with a target staff member of the plurality of staff members;
determining if the contextualized sensor data meets the alert criteria associated with the target staff member by performing steps comprising:
determining, based on the connectivity status data and the location data, a first location corresponding to a loss of connectivity of the mobile robot to the network based on the connectivity status data;
determining, based on the connectivity status data and the location data, a second location corresponding to a reconnection of the mobile robot to the network;
determining based on historical location data prior to the loss of connectivity that the robot did not finish cleaning a room corresponding to the first location prior to being moved to the second location; and
determining that the contextualized sensor data meets the alert criteria responsive to determining that the mobile robot did not finish cleaning the room;
responsive to determining that the contextualized sensor data meets the alert criteria for the target staff member, generating an alert for the target staff member; and
transmitting the alert to a client device associated with the target staff member.

12. The method of claim 1, wherein determining if the contextualized sensor data meets the alert criteria associated with the target staff member further comprises:
obtaining, from the staff member database, a work schedule associated with the target staff member; and
determining, based on the work schedule, that the target staff member is available to receive the alert at a current time.

13. The method of claim 1, wherein transmitting the alert to the client device comprises:
obtaining, from the staff member database, a communication preference associated with the target staff member; and
transmitting the alert according to the communication preference.

14. The method of claim 1, wherein determining if the contextualized sensor data meets the alert criteria associated with the target staff member further comprises;
determining that the contextualized sensor data meets alert criteria for multiple staff members including the target staff member;
determining, based on stored staff member deployment data, which of the multiple staff members are occupied with a different task; and
selecting the target staff member as one of the multiple staff members that is not occupied with the different task.

15. The method of claim 1, wherein the staff member data comprises a role for each of the plurality of staff members, an alert preference for each of the plurality of staff members, an availability status for each of the plurality of staff members, and alert criteria associated with different alerts for each of the plurality of staff members, wherein the alert criteria varies for different ones of the plurality of staff member.

16. The method of claim 1, further comprising:
setting an alert flag in association with the alert; and
responsive to the alert flag not being reset within a predefined time period, selecting an alternative staff member different from the target staff member for receiving the alert and sending the alert to the alternative staff member.

17. The method of claim 3, wherein determining if the contextualized sensor data meets the alert criteria associated with the target staff member further comprises:

obtaining, from the staff member database, a work schedule associated with the target staff member; and determining, based on the work schedule, that the target staff member is available to receive the alert at a current time.

18. The method of claim 3, wherein transmitting the alert to the client device comprises:

obtaining, from the staff member database, a communication preference associated with the target staff member; and transmitting the alert according to the communication preference.

19. The method of claim 3, wherein the contextualized sensor data further comprises voltage sensor data for a battery of the mobile robot, the method further comprising:

determining, from the voltage sensor data when a battery capacity of a battery of the mobile robot falls below a predefined threshold.

20. The method of claim 19, wherein generating the alert further comprises:

generating the alert to contain a last location of the mobile robot from the tracked location data and an indication of a low battery.

\* \* \* \* \*